US012361798B1

(12) United States Patent
Mullen et al.

(10) Patent No.: US 12,361,798 B1
(45) Date of Patent: *Jul. 15, 2025

(54) CARDS, DEVICES, SYSTEMS, AND METHODS FOR ADVANCED PAYMENT GAME OF SKILL AND GAME OF CHANCE FUNCTIONALITY

(71) Applicant: Dynamics Inc., Cheswick, PA (US)

(72) Inventors: Jeffrey D. Mullen, Pittsburgh, PA (US); Jonathan L. Beaver, Cranberry, PA (US)

(73) Assignee: Dynamics Inc., Chewick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,856

(22) Filed: Aug. 15, 2017

Related U.S. Application Data

(63) Continuation of application No. 13/855,429, filed on Apr. 2, 2013, now Pat. No. 9,734,669.

(60) Provisional application No. 61/619,197, filed on Apr. 2, 2012.

(51) Int. Cl.
*G07F 17/32* (2006.01)

(52) U.S. Cl.
CPC .................................. *G07F 17/329* (2013.01)

(58) Field of Classification Search
CPC ..................................................... G07F 17/329
USPC ....................... 463/16, 31–42; 705/14.14, 40
See application file for complete search history.

(56) References Cited

U.S. PATENT DOCUMENTS

| | | | |
|---|---|---|---|
| 4,353,064 | A | 10/1982 | Stamm |
| 4,394,654 | A | 7/1983 | Hofmann-Cerfontaine |
| 4,614,861 | A | 9/1986 | Pavlov et al. |
| 4,667,087 | A | 5/1987 | Quintana |
| 4,701,601 | A | 10/1987 | Francini et al. |
| 4,720,860 | A | 1/1988 | Weiss |
| 4,786,791 | A | 11/1988 | Hodama |
| 4,791,283 | A | 12/1988 | Burkhardt |
| 4,797,542 | A | 1/1989 | Hara |
| 5,038,251 | A | 8/1991 | Sugiyama et al. |
| 5,168,520 | A | 12/1992 | Weiss |
| 5,237,614 | A | 8/1993 | Weiss |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Masud Ahmed
(74) *Attorney, Agent, or Firm* — Morris Law Group; Robert W. Morris

(57) ABSTRACT

A user is provided with a GUI that may allow the user to change functionality associated with a non-battery-powered card, a battery-powered card, a payment sticker, or another device (e.g., a mobile telephonic device). The GUI may be provided by a website so that a user views the GUI from a web-browser. At any time, for example, a user may change additional functionality performed at a point-of-sale purchase. A user may change the additional functionality for a card or a button of a card. A user may switch to associate a game of chance or skill to the purchase.

7 Claims, 13 Drawing Sheets

(56) References Cited

U.S. PATENT DOCUMENTS 5,276,311 A 1/1994 Hennige
5,347,580 A 9/1994 Molva et al.
5,361,062 A 11/1994 Weiss et al.
5,412,199 A 5/1995 Finkelstein et al.
5,434,398 A 7/1995 Goldberg
5,434,405 A 7/1995 Finkelstein et al.
5,478,994 A 12/1995 Rahman
5,479,512 A 12/1995 Weiss
5,484,997 A 1/1996 Haynes
5,485,519 A 1/1996 Weiss
5,585,787 A 12/1996 Wallerstein
5,591,949 A 1/1997 Bernstein
5,608,203 A 3/1997 Finkelstein et al.
5,623,552 A 4/1997 Lane
5,657,388 A 8/1997 Weiss
5,834,747 A 11/1998 Cooper
5,834,756 A 11/1998 Gutman et al.
5,856,661 A 1/1999 Finkelstein et al.
5,864,623 A 1/1999 Messina et al.
5,907,142 A 5/1999 Kelsey
5,913,203 A 6/1999 Wong et al.
5,937,394 A 8/1999 Wong et al.
5,955,021 A 9/1999 Tiffany, III
5,956,699 A 9/1999 Wong et al.
6,025,054 A 2/2000 Tiffany, III
6,045,043 A 4/2000 Bashan et al.
6,076,163 A 6/2000 Hoffstein et al.
6,085,320 A 7/2000 Kaliski
6,095,416 A 8/2000 Grant et al.
6,130,621 A 10/2000 Weiss
6,145,079 A 11/2000 Mitty et al.
6,157,920 A 12/2000 Jakobsson et al.
6,161,181 A 12/2000 Haynes, III et al.
6,176,430 B1 1/2001 Hackett et al.
6,182,894 B1 2/2001 Hackett et al.
6,189,098 B1 2/2001 Kaliski
6,199,052 B1 3/2001 Mitty et al.
6,206,293 B1 3/2001 Gutman et al.
6,240,184 B1 5/2001 Huynh et al.
6,241,153 B1 6/2001 Tiffany, III
6,256,873 B1 7/2001 Tiffany, III
6,269,163 B1 7/2001 Rivest et al.
6,286,022 B1 9/2001 Kaliski et al.
6,308,890 B1 10/2001 Cooper
6,313,724 B1 11/2001 Osterweil
6,389,442 B1 5/2002 Yin et al.
6,393,447 B1 5/2002 Jakobsson et al.
6,411,715 B1 6/2002 Liskov et al.
6,446,052 B1 9/2002 Juels
6,460,141 B1 10/2002 Olden
6,592,044 B1 7/2003 Wong et al.
6,607,127 B2 8/2003 Wong
6,609,654 B1 8/2003 Anderson et al.
6,631,849 B2 10/2003 Blossom
6,655,585 B2 12/2003 Shinn
6,681,988 B2 1/2004 Stack et al.
6,705,520 B1 3/2004 Pitroda et al.
6,755,341 B1 6/2004 Wong et al.
6,764,005 B2 7/2004 Cooper
6,769,618 B1 8/2004 Finkelstein
6,805,288 B2 10/2004 Routhenstein et al.
6,811,082 B2 11/2004 Wong
6,813,354 B1 11/2004 Jakobsson et al.
6,817,532 B2 11/2004 Finkelstein
6,873,974 B1 3/2005 Schutzer
6,902,116 B2 6/2005 Finkelstein
6,970,070 B2 11/2005 Tuchler et al.
6,980,969 B1 12/2005 Tuchler et al.
6,985,583 B1 1/2006 Brainard et al.
6,991,155 B2 1/2006 Burchette, Jr.
7,013,030 B2 3/2006 Wong et al.
7,035,443 B2 4/2006 Wong
7,039,223 B2 5/2006 Wong
7,044,394 B2 5/2006 Brown
7,051,929 B2 5/2006 Li
7,083,094 B2 8/2006 Cooper
7,100,049 B2 8/2006 Gasparini et al.
7,100,821 B2 9/2006 Rasti
7,111,172 B1 9/2006 Duane et al.
7,114,652 B2 10/2006 Moullette et al.
7,136,514 B1 11/2006 Wong
7,140,550 B2 11/2006 Ramachandran
7,163,153 B2 1/2007 Blossom
7,195,154 B2 3/2007 Routhenstein
7,197,639 B1 3/2007 Juels et al.
7,219,368 B2 5/2007 Juels et al.
7,225,537 B2 6/2007 Reed
7,225,994 B2 6/2007 Finkelstein
7,246,752 B2 7/2007 Brown
7,298,243 B2 11/2007 Juels et al.
7,334,732 B2 2/2008 Cooper
7,337,326 B2 2/2008 Palmer et al.
7,346,775 B2 3/2008 Gasparini et al.
7,356,696 B1 4/2008 Lin et al.
7,357,319 B1 4/2008 Liu et al.
7,359,507 B2 4/2008 Kaliski
7,360,688 B1 4/2008 Harris
7,363,494 B2 4/2008 Brainard et al.
7,380,710 B2 6/2008 Brown
7,398,253 B1 7/2008 Pinnell
7,404,087 B2 7/2008 Teunen
7,424,570 B2 9/2008 D'Albore et al.
7,427,033 B1 9/2008 Roskind
7,454,349 B2 11/2008 Teunen et al.
7,461,250 B1 12/2008 Duane et al.
7,461,399 B2 12/2008 Juels et al.
7,472,093 B2 12/2008 Juels
7,472,829 B2 1/2009 Brown
7,494,055 B2 2/2009 Fernandes et al.
7,502,467 B2 * 3/2009 Brainard ................. G06F 21/31 713/168
7,502,933 B2 * 3/2009 Jakobsson ............ G06Q 20/341 713/172
7,503,485 B1 * 3/2009 Routhenstein ......... G06Q 20/04 235/375
7,516,492 B1 * 4/2009 Nisbet ................... G06F 21/554 717/136
7,523,301 B2 4/2009 Nisbet et al.
7,530,495 B2 5/2009 Cooper
7,532,104 B2 5/2009 Juels
7,543,739 B2 6/2009 Brown et al.
7,559,464 B2 7/2009 Routhenstein
7,562,221 B2 7/2009 Nystrom et al.
7,562,222 B2 7/2009 Gasparini et al.
7,580,898 B2 8/2009 Brown et al.
7,584,153 B2 9/2009 Osterweil et al.
7,591,426 B2 9/2009 Osterweil et al.
7,591,427 B2 9/2009 Osterweil
7,602,904 B2 10/2009 Juels et al.
7,631,804 B2 12/2009 Brown
7,639,537 B2 12/2009 Sepe et al.
7,641,124 B2 1/2010 Brown et al.
7,660,902 B2 2/2010 Graham et al.
7,828,207 B2 11/2010 Cooper
2001/0034702 A1 10/2001 Mockett et al.
2001/0047335 A1 11/2001 Arndt et al.
2002/0059114 A1 5/2002 Cockrill et al.
2002/0082989 A1 6/2002 Fife et al.
2002/0096570 A1 7/2002 Wong et al.
2002/0120583 A1 8/2002 Keresman, III et al.
2003/0034388 A1 2/2003 Routhenstein et al.
2003/0052168 A1 3/2003 Wong
2003/0057278 A1 3/2003 Wong
2003/0116635 A1 6/2003 Taban
2003/0152253 A1 8/2003 Wong
2003/0163287 A1 8/2003 Vock et al.
2003/0173409 A1 9/2003 Vogt et al.
2003/0179909 A1 9/2003 Wong et al.
2003/0179910 A1 9/2003 Wong
2003/0226899 A1 12/2003 Finkelstein
2004/0035942 A1 2/2004 Silverman
2004/0133787 A1 7/2004 Doughty
2004/0162732 A1 8/2004 Rahim et al.
2004/0172535 A1 9/2004 Jakobsson

(56) References Cited

U.S. PATENT DOCUMENTS

| | | | |
|---|---|---|---|
| 2004/0177045 A1 | 9/2004 | Brown | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0096135 A1* | 5/2005 | Houchin | G07F 17/32 463/42 |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0155468 A1* | 7/2007 | Olmstead | G07F 17/329 235/375 |
| 2007/0162330 A1* | 7/2007 | Olmstead | G06Q 30/02 705/14.36 |
| 2007/0174614 A1 | 7/2007 | Duane et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0270201 A1* | 11/2007 | Olmstead | G06Q 30/02 463/16 |
| 2007/0192249 A1 | 12/2007 | Biffle et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0112760 A1* | 4/2009 | Johnson | G06Q 20/4037 705/40 |
| 2009/0150295 A1 | 6/2009 | Hatch et al. | |
| 2009/0152365 A1 | 6/2009 | Li et al. | |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2011/0028184 A1 | 2/2011 | Cooper | |
| 2011/0060691 A1* | 3/2011 | Grossman | G06Q 20/387 705/80 |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.

The Bank Credit Card Business. Second Edition, American Bankers Association, Washington, D.C., 1996.

A Day in the Life of a Flux Reversal. http://www.phrack/org/issues.html?issue=37&id=6#article. As viewed on Apr. 12, 2010.

Dynamic Virtual Credit Card Numbers. http://homes.cerias.purdue.edu/~jtli/paper/fc07.pdf. As viewed on Apr. 12, 2010.

English translation of JP 05210770 A.

* cited by examiner

200

600

FIG. 12
1200
1210
1211
Developer sets game of skill rules
1212
Developer selects prizes for game of skill
1214
Game of skill starts for a threshold (time, number of games)
1215
Every pre-determined amount earns a game of skill
1216
A prize is won based on the game of skill won
1217
If a prize is won, winner moves to next round if next round exists
1218
If more than one player needed for round, wait for players
1219
Start round when enough players join
1220
1221
Purchase is made
1222
Part of purchase revenue is allocated to a round of game of skill
1223
Part of purchase revenue is allocated to other rounds
1224
Cost of game accounted when a player wins a prize through a game
1225
Stop game after final round
1226
While a user is playing a game, purchases can still be made
1227
Additional game played based on purchase volume
1228
Item distributed if won
1230
1231
Developer selects game of skill template
1232
Developer tests game of skill using automated tests
1233
Developers game of skill is approved for publicatoin
1234
Developers game of skill is published
1235
Developers game of skill is played
1236
Developers game of skill is monitored for integrity
1237
Developers game of skill is warned if integrity is compromised
1238
Developers game remains published if issues are fixed within period of time
1240
1241
Purchase is made
1242
Game of skill awarded
1243
Game played
1244
Transaction does not settle
1245
Item not awarded or awarded item reclaimed

CARDS, DEVICES, SYSTEMS, AND METHODS FOR ADVANCED PAYMENT GAME OF SKILL AND GAME OF CHANCE FUNCTIONALITY

This application claims the benefit of U.S. Provisional Patent Application No. 61/619,197, titled "CARDS, DEVICES, SYSTEMS, AND METHODS FOR ADVANCED PAYMENT GAME OF SKILL AND GAME OF CHANCE FUNCTIONALITY," filed Apr. 2, 2012, which is hereby incorporated by reference herein in its entirety.

BACKGROUND OF THE INVENTION

This invention relates to magnetic cards and devices and associated payment systems.

SUMMARY OF THE INVENTION

Systems and methods are provided for allowing a user to select one or more additional services be performed in addition to the payment of goods with a payment card or other device (e.g., a mobile telephonic device, a tablet computer device, or another electronic device). A card, or other device, may include one or more buttons. A user may associate an additional service, or additional services, to a button of a card at any time. At the time of purchase, information indicative of the button the user selected may be passed to a point-of-sale system with a user's payment information. Such data may be, for example, communicated through a merchant acquirer's network to a processing facility. The processing facility may, for example, authorize a payment transaction and forward the information indicative of the button a user selected and the identity of a user to a remote facility. Such a remote facility may, for example, forward at least some of such information, as well additional information, to a third party service provider such that the third party service provider enacts the additional feature, or features, desired by the user.

The remote facility, or another facility, may additionally perform one or more features. The remote facility, or another facility, may perform the one or more features based on instructions received from a third party service provider. For example, a user may utilize a device, such as a wireless telephonic device, to associate a third party service feature to a button of the card. For example, a user may select a particular feature for a particular third party sweepstakes provider for a particular button of a card, or other device, from a wireless telephonic device. The feature, may be, for example, a feature that provides entries to a sweepstakes based on, at least in part, the amount of the purchase. Accordingly, a user may earn entries to a game of chance, such as a sweepstakes with monetary prizes, based on purchases a user makes with his/her payment card. A third party service, for example, may be a game of skill (e.g., trivia). A user may earn entries to the game of skill based on purchases a user makes with his/her payment card. A user may earn entries based on the amount of the purchase, the type of merchant where the purchase is made (e.g., gas station versus retail store), and/or the identity of the merchant where the purchase is made (e.g., Joel's Pizza versus Ashley's Pizza).

A user may then, at a point-of-sale, press the button and the card, or other device, may communicate payment information to the point-of-sale device that includes information indicative of the button that was pressed by the user. The point-of-sale system may forward this received information to a payment processor via, for example, a merchant acquirer. The payment processor may forward all, or a portion of, the received payment information to, for example, a remote facility. The remote facility may then discern from the received information that a particular user made a purchase of a particular amount at a particular merchant on a particular date and that the user pressed a particular button on the user's card, or other device. The remote facility may also keep track of the selections the user has made for the particular buttons on the user's payment card, or other device, that are associated with particular third party features. In doing so, the remote facility may recognize a user and associate a third party functionality with the purchase. The remote facility may then forward at least a portion of the received payment information, as well as additional information, to the third party service provider(s) the user associated with the selection utilized for the purchase. The third party service provider may then perform a function. For example, the remote facility may forward user identification information and the amount of the purchase to a third party service provider. For example, a sweepstakes may utilize this received information to provide a reward (e.g., entries into the sweepstakes) to a particular sweepstakes for the user associated with the purchase. The user may be provided with, for example, the ability to select from different sweepstakes. For example, different sweepstakes with monetary rewards at different sizes and odds may be provided in addition to sweepstakes with different types of items and/or service prizes (e.g., a prize of a trip or a prize of a vehicle).

Additional features may be provided by the remote facility. Such features may include, for example, a piggyback purchase transaction. For example, a third party service provider feature may utilize a piggyback purchase transaction such that a second transaction is initiated with a purchase as part of the third party service provider feature. For example, a particular reward may be provided by a third party service provider for a particular additional cost. The third party reward may be purchased when a payment card, or other device, is utilized to make a purchase. Thresholds may be provided by the third party service provider such that the reward may be purchased if the purchase is made at, for example, a particular merchant location, on a particular date, and/or a particular amount is spent on the purchase. For example, a game of skill may provide a user with a particular number of entries based on the amount of purchase and the game of skill may double those entries for an additional cost of $1. As per another example, a game of skill provider may provide a user with a game of skill for $1 whenever a purchase is made with a payment card and, for example, an associated feature is selected for that purchase. The remote facility may receive instructions from the third party service provider (e.g., after received payment and user identification information is provided to the remote service provider) indicative of the request for the remote facility to perform a particular piggyback transaction for a particular purchase for a particular user. Alternatively, for example, the third party service provider may pre-define a particular feature to have a piggyback transaction such that the remote facility performs the piggyback transaction at the time the remote facility determines the feature was selected by a user and a purchase utilizing the feature was made. During a piggyback transaction, for example, a second purchase may be initiated at a particular cost or a cost associated with the amount of the primary purchase (or other characteristic(s)). The piggyback transaction may be initiated by, for example, the remote facility (e.g., the technology provider controlling the operation of the remote facility). More than one piggyback transaction may be initiated for a feature associated with a purchase.

Dynamic purchasing descriptors may be utilized such that a purchase is made with a particular descriptor that reaches a user's payment card bill. The dynamic purchase descriptor may include, for example, not only the name of the merchant (e.g., the operator of the remote facility such as Dynamics Inc.), but also additional information that a user can utilize to assist in identifying the purchase. For example, the additional information may include the third party service provider (e.g., SweepstakesCompanyA), the type of feature (e.g., PiggyBackPurchase), the date of the primary transaction (e.g., 1.1.13), and the merchant of the primary transaction (e.g., StoreA). Accordingly, a portion of the dynamic purchase descriptor may read DynamicsInc-PiggyBackPurchase-SweepstakesCompanyA-1.11.11StoreA. In doing so, a user may, for example, be able to properly identify the secondary transactions and link the secondary transactions to the primary transactions. A feature and purchase history may also be viewable on a graphical user interface utilized by a user to select a feature. Such a graphical user interface may be provided, for example, on a webpage or application on a wireless telephonic device, a tablet computer, a stationary computer, or any other device.

A user may select different features, for example, for different cards or different buttons of a card. For example, a user may have a debit card and a credit card and may associate different features to the different cards.

A piggyback transaction may carry with it a cost. For example, the operator of the remote facility may charge a particular percentage and/or transaction fee for each secondary purchase. For example, a percentage of approximately 20-40% (e.g., approximately 25-35% or approximately 30%) of the purchase price may be charged to the third party service provider utilizing the piggyback transaction.

Additional features may be provided by the remote facility. Such features may include, for example, a value credit transaction where a credit is added to a payment card (e.g., value is transferred to the user). Such a credit may, for example, be in the form of a payment on a payment card (e.g., a payment to a credit card). Multiple methods may be utilized to put value on a payment card. For example, credit account to credit account payment may occur. As per another example, an Original Credit Transaction (OCT) may occur such that a statement credit is provided on a cardholder's statement. A value credit transaction may be initiated by a remote facility at the instruction of a third party service provider or by the remote facility as a result of pre-set rules for a particular feature initiating a value credit transaction. Dynamic descriptors may also be provided for a value credit transaction. Accordingly, a user may receive a value credit from, for example, an operator of a remote facility and may look at his/her credit card bill and see the value added to the bill and be able to discern the primary transaction from which the secondary value credit was initiated. The dynamic value credit descriptor may include, for example, not only the name of the merchant (e.g., the operator of the remote facility such as Dynamics Inc.), but also additional information that a user can utilize to assist in identifying the purchase. For example, the additional information may include the third party service provider (e.g., SweepstakesCompanyA), the type of feature (e.g., ValueCreditAdditional), the date of the primary transaction (e.g., 1.1.11), and the merchant of the primary transaction (e.g., StoreB). Accordingly, a portion of the dynamic purchase descriptor may read DynamicsInc-ValueCreditAddition-SweepstakesCompanyA-1.11.11StoreB.

A value credit transaction may carry with it a cost. For example, the operator of the remote facility may charge a particular percentage and/or transaction fee for each secondary purchase. For example, a percentage of approximately 1%-30% (e.g., approximately 30%) of the value credit transaction may be charged to the third party service provider utilizing the value credit transaction.

A third party service provider may utilize a value credit transaction in a number of ways. For example, a provider of a game of skill or a game of chance or another value transfer structure, may utilize a value credit transaction to provide such value transfers. For example, a game of skill provider may allow users to purchase entries to a game of skill for all or a particular subset of merchants. A remote facility may forward payment information and user identification information to the game of skill provider. The game of skill provider may, in turn, utilize this information to determine whether a game of skill applies. If a game of skill applies for that user at that merchant, for example, the user may be provided instructions on how to access the game of skill. In doing so, for example, a game of skill may be awarded and redeemed utilizing a user's payment card, or other device (e.g., wireless payment telephone).

A remote facility may provide transaction and user identification information to a third party service provider at authorization as well as at settlement. The operator of the remote facility may provide value to the third party service provider for a user utilizing a service from that third party service provider for a transaction. For example, basis points on transaction volume may be provided to the third party service provider in addition to transactional data. This basis point payment to the service provider may be made at settlement. Third party service providers may, for example, initiate a third party function based on authorization, but may be required by the operator of the remote facility to remediate the functionality in the event the transaction does not settle. Such a remediation may be, for example, a reversal of the third party feature or a notification to the user from the third party service that the transaction did not settle. The operator of the remote facility may, for example, provide its own features for purchase transactions. Similarly, other entities (e.g., third party service providers) may perform any/all of the functionality of the remote facility. Additional remote facilities may be utilized to perform all, or portions of, the functionalities of the remote facility or third party service providers.

Third party features may be categorized. For example, a category may include sweepstakes applications and other applications. A two-button card may have one button associated with one of these categories and another button associated with the other one of these categories. A user may select, for example, a feature from the category associated with the button. In doing so, a user may more easily remember the third party service feature selected for a particular button by being able to more easily remember what feature was associated with the button's category. Any number of buttons and categories may be utilized for a card or other device.

A Graphical User Interface (GUI) may be utilized by a user to associate a third party service to a particular button of a card (e.g., or to a card) or other device. The GUI may be provided via a wireless telephone, tablet computer, stationary computer, portable laptop computer, or any other device. A GUI may be provided on the webpage of a bank issuing the user's payment card (e.g., on the user's profile/account page of the issuing bank). The GUI may include an option for a user to associate a feature with an online transaction. The GUI may include an option for a user to associate a feature with an in-store transaction that is manually entered by a cashier. The GUI may, for example, include an option for a user to associate a feature with any transaction not performed via a card communicating to a point-of-sale reader in a store. Such an option, for example, may include transactions associated with card-not-present transactions (e.g., phone and internet transactions) and manually entered transactions.

Selection of a feature may be provided, for example, by a Graphical User Interface (GUI) provided on a computing device (e.g., a mobile telephonic device) as a software application for that device or via the internet or an intranet through a web browser. Such a selection may be provided with a non-powered card such that a single feature may be associated with a card for a period of time. Such a selection may be associated to an option (e.g., a button) on a powered card or other device (e.g., a mobile telephonic device) such that the user may associate different features with different options (e.g., different buttons). Accordingly, for example, a user may receive a powered card, or other device, in the mail and use his/her web browser to associate different additional features to different buttons. The user may then utilize the card in a store and press a button in order to select that feature. A card, or other device, may download information (e.g., via a wireless communication such as a light or electromagnetic communication) such that the card, or other device, displays information next to an option indicative of the feature (e.g., "Play Game of Chance A," "Play Game of Skill A"). Alternatively, no download may be provided and no additional information may be provided such that a user's card, or other device, includes a generic descriptor (e.g., "credit" and "feature," or "feature 1" and "feature 2," or "debit" and "feature 1" and "feature 2").

A remote facility may also receive additional information than just a user identifier and information indicative of the option selected by a user (or that the user made a payment). Such additional information may be, for example, the type of merchant (e.g., a retail merchant or a gas merchant), the location of a merchant (e.g., the zip code of a merchant), the type of transaction (e.g., online or in-store purchase), the name of the merchant (e.g., "Amazon.com," or "Walmart"), the amount of the transaction (e.g., $10.25), and any other information. Such a remote facility may forward such information to a third party service provider in addition to information generated by the remote facility (e.g., a second user identifier such that different identifiers are used with the facility sending payment information and the third party service provider).

An ecosystem may be provided in which a development kit is available for third parties to develop applications for payment cards or other devices. The ecosystem provider may, alternatively, develop a part or all of the application for a third party. All, or part of, a third party application may be hosted at the ecosystem provider or the third party provider. For example, a part of the third party application may be hosted by the ecosystem provider and a part of the third party application may be hosted by the third party. The ecosystem provider may be, for example, the provider of the device that selects the feature to be utilized with a purchase. A GUI may be provided where a user can select different third party applications to be associated with a user's payment. The third party applications may need to be approved by an administrator before being accessible by a GUI. Different categories of third party applications may be provided on the GUI (e.g., a game of skill category, a game of chance category). The development kit may provide the ability for a third party service provider to, for example, receive user identification numbers and other information (e.g., merchant name and location) and provide particular information back (e.g., within a period of time) to a remote facility.

Information indicative of a button press, or use of a card, that triggers a feature may be provided in a payment message utilized at authorization and/or at settlement. Furthermore, the service provider may return information in a period of time that permits actions to be performed pre-authorization or pre-settlement. Information may also be provided that is indicative of charge-offs, charge-backs, and returns.

The payment actions may be determined, for example, via a user interaction with the card. Particularly, for example, a user may press a button on the card, from a group of buttons, that is associated with the third party feature. Such third party features may be unique from the features provided to the user via the third parties non-payment card or device services. Accordingly, a user may obtain the benefit of the whimsical and festive nature of a unique feature every time the user makes a payment. Information indicative of feature selection may be provided, for example, via an output device operable to be read by a card reader. For example, the feature may be provided by a dynamic magnetic stripe communications device, an RFID antenna, an exposed IC chip, or any other type of card reader. For online purchases, for example, a display may be provided on the card and a user selection may cause a particular number (e.g., a particular code) to be displayed on the card. Such a code may be entered into a text box on a website at checkout and may be representative of the user's desired feature. Accordingly, the feature may be communicated to a remote server such that the feature may be performed in the third party service on behalf of the user. The code may additionally provide the benefits of a security code and may be entered with a payment card number (e.g., a credit or debit card number) at online or in-store checkout.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

A game of chance may be provided as a feature for a payment card or other device. A cardholder may earn entries into the game of chance. For example, the cardholder may earn 1 entry for each $1 the cardholder spends. The cardholder may earn the entries at the point-of-purchase. The sweepstakes may be run for each cardholder after each purchase. The odds of the sweepstakes may be set so that the odds for winning a prize does not change when a prize is won. Alternatively, for example, the odds may be variable. A game of chance may have a particular number of prizes with variable odds and a particular number of prizes with set odds. A portion of each transaction may be utilized to fund the game of chance. For example, approximately 25 to 125 basis points of the transaction may be utilized to fund the game of chance. For example, approximately 25 to 50 basis points may be utilized to fund prizes. Example of prizes may include, for example, a particular amount of statement credit (e.g., $10), a statement credit for a cardholder's purchase up to a particular amount (e.g., up to $100), a coupon, a voucher, points, miles, instant win rewards, etc. For example, a game of chance may have four prize tiers, a first tier of points, a second tier of $10 statement credits, a third tier of a statement credit equal to the purchase value of the winning purchase up to $100, and a fourth tier of $1,000,000. With 1,000,000 users utilizing the application on purchase spend of $10,000 each and with half of a 25 basis point of funding being used to fund $1,000,000 prize, approximately 12.5 $1,000,000 prizes will be awarded each year.

A user may, with a game of skill, a game of chance, or any application, be directed to provide contact information so the user can be provided with winnings (e.g., instant winnings) from the games and/or applications. For example, a user may enter in the user's email address, phone number, and mailing address. Such information may be collected, for example, when a payment card, or other device, is purchased and/or applied for.

Such contact information may be utilized, for example, to indicate to a user that the user has won a prize. For example, a user may receive within a particular amount of time from authentication and/or settlement, a communication, such as a text message, indicating whether the user has won a prize and what prize the user has won. Accordingly, rewards may be delivered to a consumer in near real-time as the user makes purchases. Alternately, rewards may be delivered to a consumer instantly and the consumer may be able to redeem such rewards instantly either at the point of sale where the consumer earned the instant rewards or elsewhere. The reward (e.g., the prize) may be unable to be redeemed until the purchase has settled and/or a particular amount of time has passed (e.g., between approximately 15 and 60 days). Different games of chance may be provided based on the type of merchant where the purchase occurred or the name of the merchant where the purchased occurred.

A game of skill may be provided with each purchase or after a particular amount is purchased. Different games of skill may be provided based on the type of merchant where the purchase occurred or the name of the merchant where the purchased occurred. Entries for a game of skill may be provided for an amount of purchase and a particular amount of entries may be redeemed to play a particular game of skill and/or to play for a particular prize category in a game of skill.

A game of skill may take many forms. For example, a game of skill may include trivia questions. A number of cardholders may compete to win a round of trivia. The winner of the round may be awarded a prize. Winners may be determined, for example, based on the number of questions answered correctly and the time the cardholder took to answer the questions correctly. A winner of a round may, for example, advance to the next round where a higher value prize may be provided. A game of skill may end after a particular number of rounds (e.g., between 5 and 10 rounds). Another game of skill, for example, may be to play a video game to earn a score. The funding of the prizes may be, for example, associated with the purchase. For example, approximately 25-125 basis points may be paid from a card issuer and/or payment network to the provider of the ecosystem. The provider of the ecosystem may, in turn, provide a particular amount of basis points (e.g., 25-75 basis points) to a third party developer (e.g., a game of skill developer). The third party developer, or in the instance where the ecosystem provider is the game developer, may take a portion of the basis points to fund the prizes for the game of skill (e.g., 25-50 basis points). For example, more than half the basis points earned by the game of skill provider may be used to fund prizes. A game of skill, for example, may not begin until a particular number of cardholders (e.g., 25) have become eligible for the game of skill. At this time, for example, the cardholder may be allowed to play a game of skill or may be sent a communication noting when and how to start the game of skill (e.g., a time to login to a particular website).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
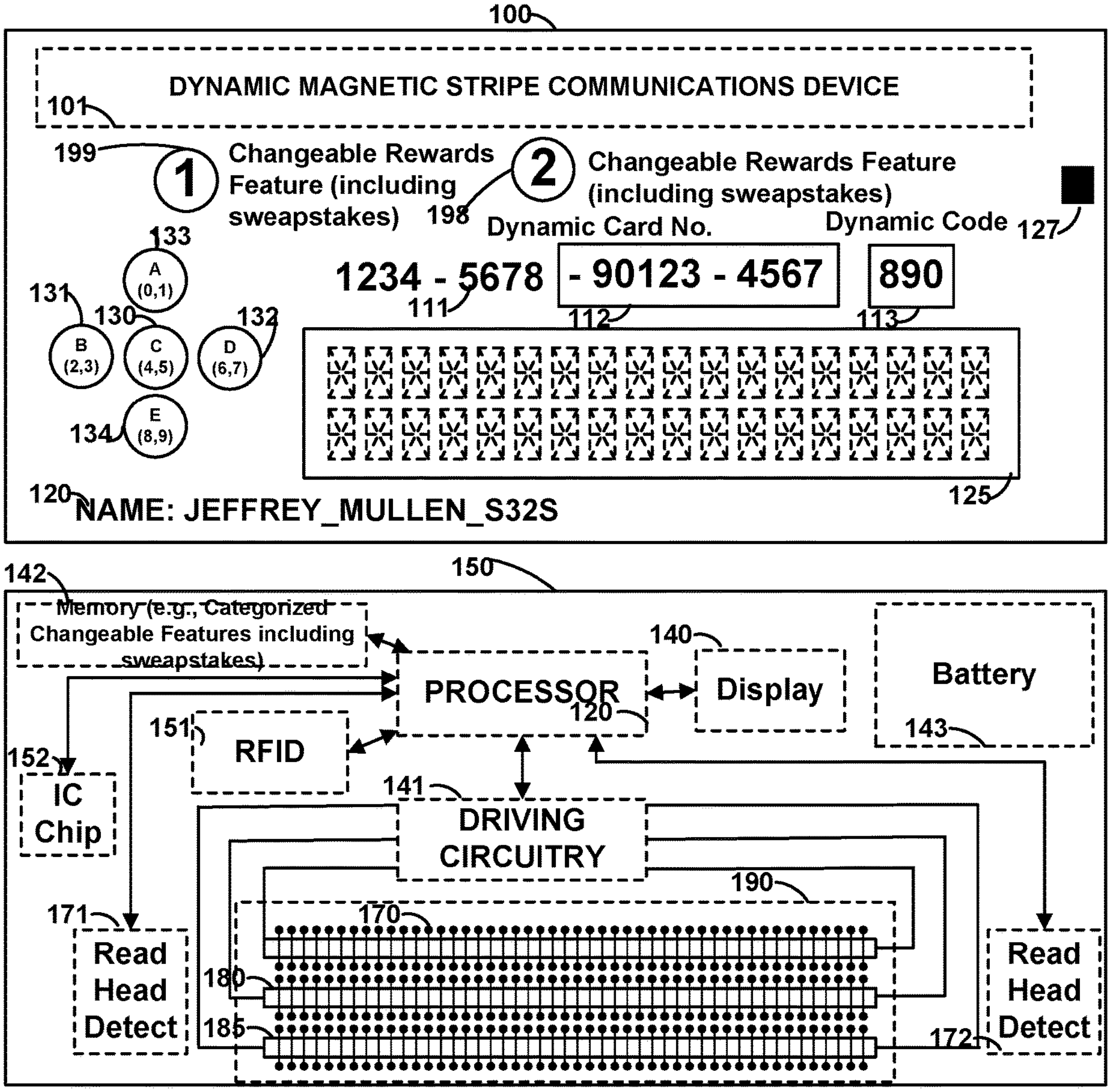
FIG. 1 is an illustration of a card and architecture constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's desire to communicate a single track of magnetic stripe information. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate two tracks of magnetic stripe data). Multiple buttons may be provided on a card and each button may be associated with a different user selections. Display 125 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction. Button 198 and button 199 may each be associated with, for example, a different third party service provider feature from a different category of third party service provide features and may be changed by a user at any time to different third party service provider features within the category associated with a particular button. The third party feature associated with a button may be changed by a user on a GUI provided by a device provider, remote facility provider, card issuer, processor, or any other entity. For example, a third party service provider may, on its website or application, allow a user to change the third party feature performed when the third parties feature button is selected by a user on the user's card or other device. For example, a category may be to earn rewards and another category may be other types of features. Accordingly, a user may select the type of reward (e.g., via button 199) the user desires to be associated with the rewards button and the user may earn such rewards when a transaction occurs utilizing that button. Types of rewards may be, for example, various types of games of chance (e.g., sweepstakes). Other functionalities may be, for example, associated with a button having another category (e.g., button 198). For example, a game of skill feature may be provided from a feature provider and a piggyback transaction feature may be provided by another service provider. Accordingly, a user may more easily remember the application the user selected for each button as each button may be associated with a different category for different types of features.

The selection of a feature may or may not have a cost associated with it. If a cost is associated with the feature, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed among the card issuer and/or device provider). The remainder of the fee may be provided, for example, to the third party service provider. A cost may be associated to a feature selection, but may not be a cost to a user. Instead, for example, the cost may be a cost to a third party service provider. The cost may be provided, for example, to other entities such as, for example, the device provider, card issuer, card processor (which may be the same, for example, as the card issuer), or any other entity (e.g., card network).

Architecture 150 may be utilized with any card. Architecture 150 may include processor 120. Processor 120 may have on-board memory for storing information (e.g., drive code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data, for example, that is unique to a particular card. Memory 142 may include any type of data. For example, memory 142 may store discretionary data codes associated with buttons of a card (e.g., card 100 of FIG. 1). Such codes may be recognized by remote servers to effect particular actions. For example, a code may be stored on memory 142 that causes a third party service feature for a particular sweepstakes to be performed by a remote server (e.g., a remote server coupled to a third party service such as game of chance provider). More particularly, memory 142 may include information indicative of different categories and such information may be communicated to a remote facility. The remote facility may, in turn, utilize the category utilized by the user at a purchase to determine the feature, for example, previously selected for that category by the user. Different third party features may be associated with different buttons. Or, for example, a user may scroll through a list of features and/or feature categories on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

A card may include, for example, any number of light sensors 127. Light sensors 127 may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, a light sensor. Architecture 150 may receive information from a light sensor. Processor 120 may determine information received by a light sensor.

Persons skilled in the art will appreciate that a user may associate any payment card with a remote facility (e.g., by entering the user's payment card details). A user may then be provided with value credits (e.g., via an original credit transaction method) when, for example, the card is utilized to complete a purchase transaction. Features may be associated to a card via a GUI (e.g., via a web browser or an application of a device such as a wireless telephonic device or tablet computer).

Figure 2:
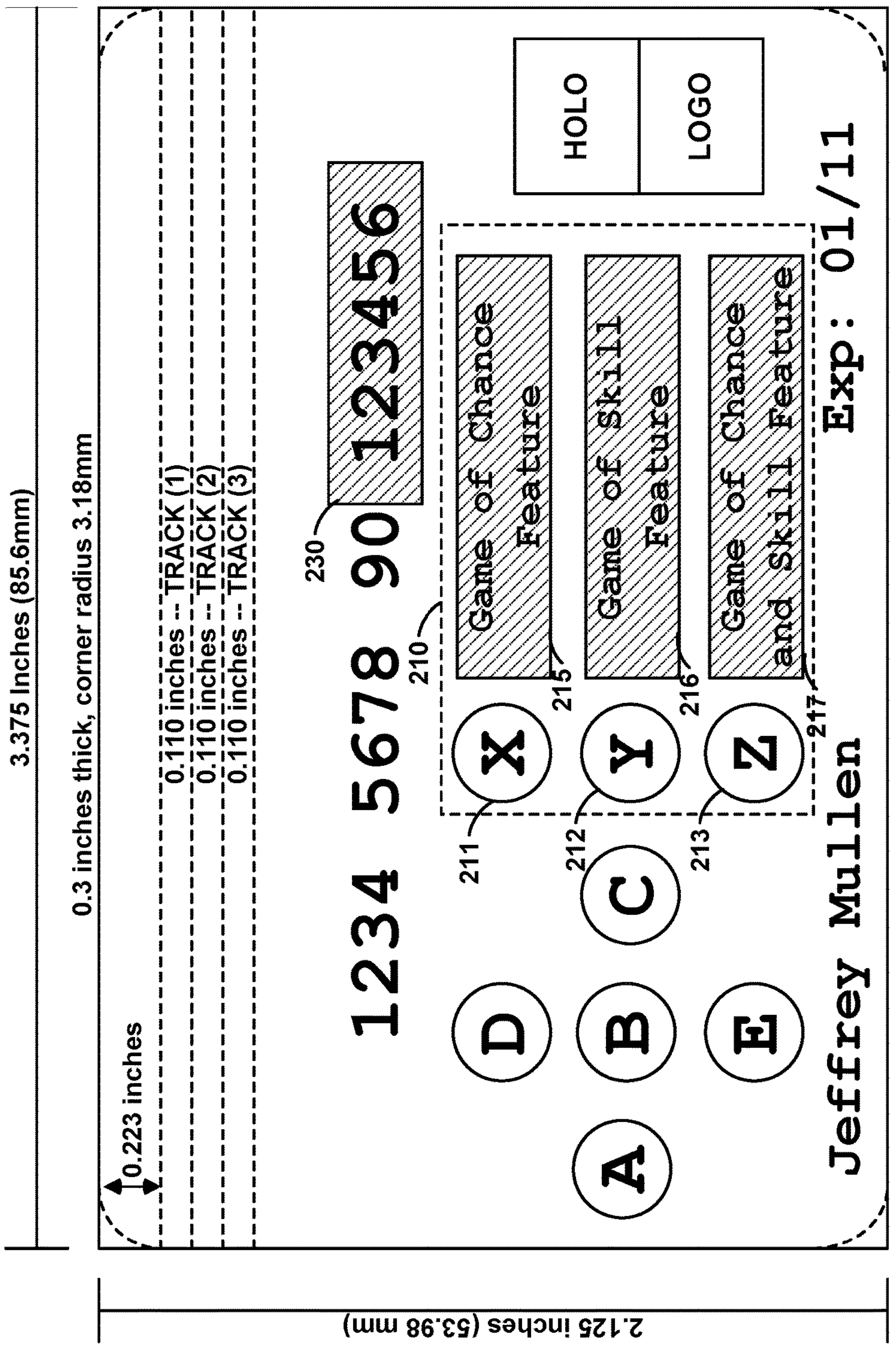
FIG. 2 is an illustration of a card constructed in accordance with the principles of the present invention.

FIG. 2 shows card 200 that may include, for example, display 230 and interface 210. Interface 210 may include, for example, displays 215, 216, and 217 as well as buttons 211, 212, and 213. Display 215 may be associated with button 211. Display 216 may be associated with button 212. Display 217 may be associated with button 213. Display 230 may be utilized to display, for example, all or a portion of one or more payment card numbers such as a credit card number, debit card number, gift card number, pre-paid card number, loyalty card number, and/or any other card number. A card may be issued with a pre-determined set of actions associated with buttons 211-213. Such actions may correspond to actions that control a portion of a service from one or more third party service providers. A user may, at the time of applying for a payment card (or a payment service on another device such as a mobile telephonic device), select a particular card and/or buttons for a particular one or more third party services and also select the particular feature or features from the selected third party service or services for the card and/or buttons. Information associated with the third party service and feature for a button may be displayed on a display in the proximity of that button. Information associated with a feature for a button may also be permanently provided on the card in the proximity of a button. Such permanent indicia may take the form of printed indicia, embossed indicia, and/or engraved indicia. A user may change the actions for particular buttons online (e.g., via a website associated with a card issuer or a game provider). Such a change may be implemented, for example, on backend systems. Accordingly, for example, a remote server may change the way it uses different messages received from the card. In doing so, a user may change features and third party services without having to change the operation of a card. Such a change may be implemented, for example, on the card. For example, a card may receive information wirelessly (e.g., via light and/or sound) indicative of a desire to change the feature for a particular button. Accordingly, the card may reconfigure the uses of each button, display different information, and communicate different information when a particular button is selected. Such re-configuration instructions may be communicated manually to a card (e.g., via a code manually entered into buttons on the card). For example, each button of card 200 may be associated with a feature from a different third party service provider. A user may change feature preferences and, as a result, may want to add, remove, or modify a third party service provider feature. In reconfiguring the card or the backend, the user may, for example, add a feature for a third party service that was released after card 200 was issued to the user.

Third party service features may take many forms. Users may be provided with a visual display of the name of the feature or the type of the feature. For example, display 215 may include the type of the feature associated with button 211 (e.g., a piggyback purchase transaction). Display 216 may include the type of the feature associated with button 212 (e.g., a statement credit feature such as a value credit transaction performed via an original credit transaction method). Display 217 may include the type of feature associated with button 213 such as, for example, a transactional information feature. A transactional information feature may provide purchase transactional information (e.g., authorization and/or settlement data) to a third party service provider such that this data may be utilized to provide a feature to a user. Such a feature may include, for example, a sweepstakes that provides different prizes based on the merchant type associated with a purchase on a profile page of the user on a particular website (e.g., a third party service provider website such as a sweepstakes providers website). Thus, for example, a user may win free gas for purchases at a gas station and free food for purchases at restaurants. A game of chance feature may, for example, be provided where a user is provided with prizes associated with a particular merchant (e.g., Joel's Pizza) or a particular store of a merchant (Joel's Pizza on 6$^{th}$ Street in Austin, Tex.) on the user's profile as a result of the purchase.

Figure 3:
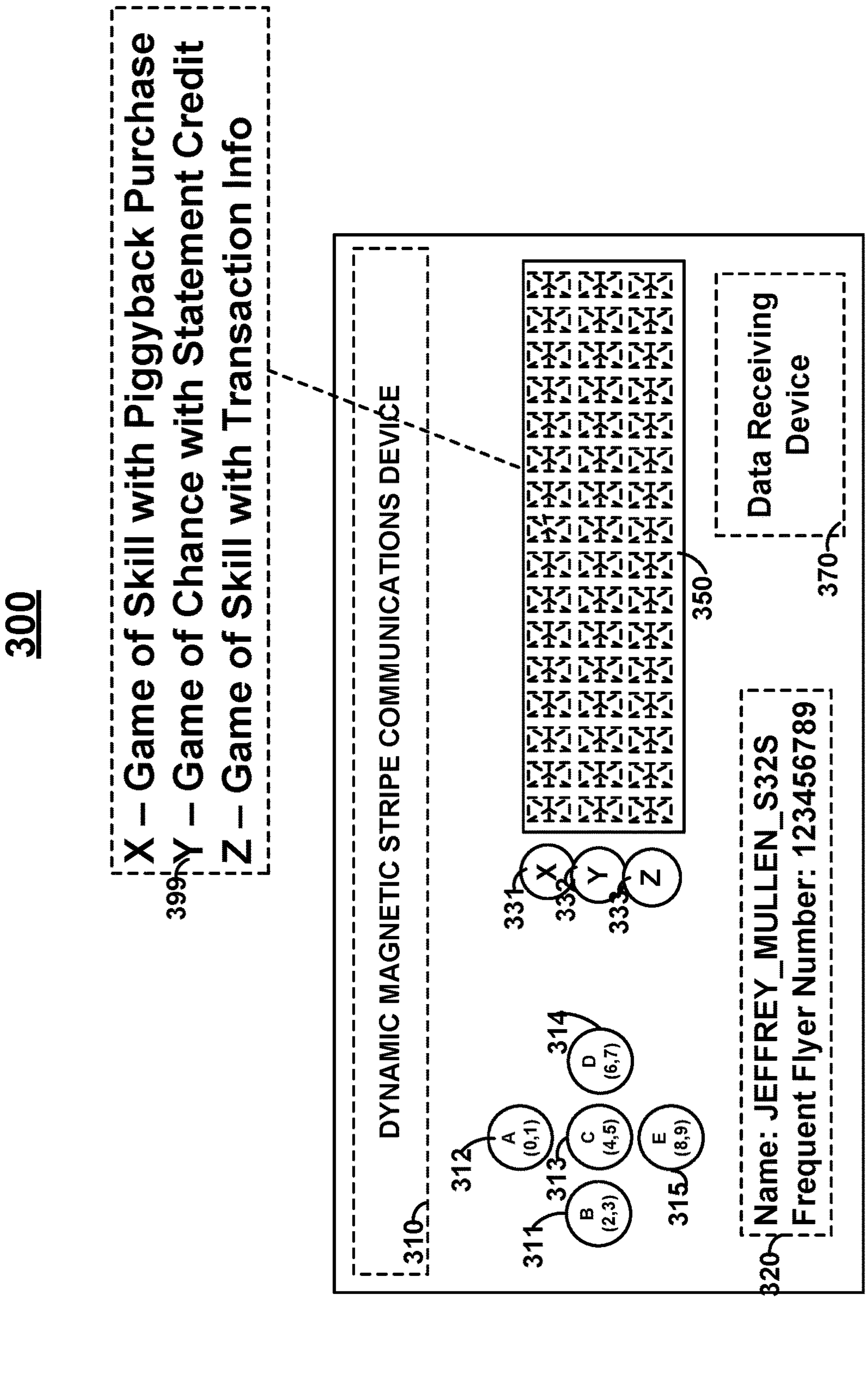
FIG. 3 is an illustration of a card constructed in accordance with the principles of the present invention.

FIG. 3 shows card 300. Card 300 may include buttons 311-315, display 350, data receiving device 370, permanent information 320, and dynamic magnetic stripe communications device 310. Display 350 may include a graphical user interface such as interface 399. In graphical user interface 399, three options are provided. A user may select an option by selecting a button that corresponds to that option. Each option may be the ability for a user to use a different third party service provider feature for a purchase.

For example, graphical user interface 399 may include an option associated with a game of chance feature, a game of skill feature, and a game of chance and a game of skill feature. In this manner, a cardholder may press the button associated with the desired feature. Information indicative of the selection may be communicated to a remote server via an in-store purchase via a communications device located on the card (or other device). The remote server may, in turn, route a copy of at least a portion of the transaction data to a third party feature provider, with identification information associated with the cardholder, so that the third party feature provider can provide the selected feature.

Graphical user interface 399 may include an option associated with, for example, a game of skill that includes a piggyback purchase. The proceeds of the piggyback purchase may, for example, provide a user with entry into the game of skill and/or higher prize tiers associated with the game of skill. Persons skilled in the art will appreciate that prizes may take various forms. For example, a prize may include a virtual object (e.g., a virtual character, animal, ornament, vehicle, and/or horse) in a social game. A prize may include digital content such as, for example, digital music, digital books, digital comic books, digital TV episodes, and/or digital movies. Such digital content may also be provided as physical content. For example, a CD with music, DVD with movies or TV episodes, a book, and/or a comic book may be physically sent to a cardholder as a prize. A feature may include a game of chance where at least one or more prizes include statement credits. A feature may include a game of skill where the game of skill, or components or prizes of the game of skill are associated with the transactional information of the purchase. For example, a fast food game may be provided when a purchase, or a purchase of at least a certain amount, is made at a fast food retailer. In this manner, a driving game may be provided when a purchase, or a purchase of at least a certain amount, is made at a store that sells automobiles and/or automobile parts and/or automobile repair.

Figure 4:
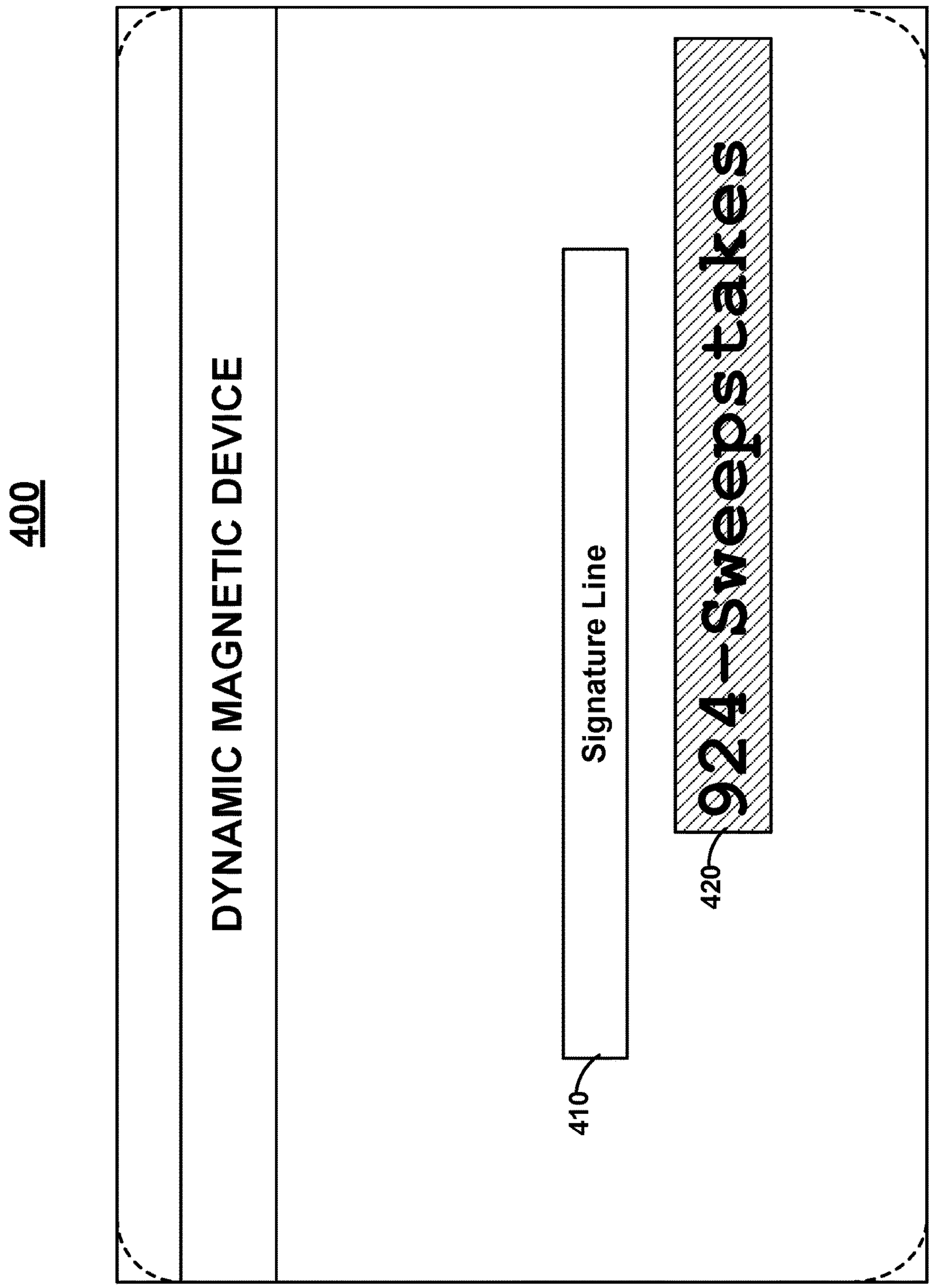
FIG. 4 is an illustration of a card constructed in accordance with the principles of the present invention.

FIG. 4 shows card 400 that may include signature line 410 and display 420. A code may be provided on display 420 indicative of a particular third party service provider feature such as a feature having a sweepstakes to the feature. The code may be entered as a security code for an online transaction. For example, a user may press a button associated with getting a third party service feature with his/her purchase. Such a button may be provided on the obverse side of a card. Similarly, a button may be provided on the reverse side of a card (e.g., the side of the card shown in card 400). The reverse side of the card may then display a security code that is indicative of the desire for a user to utilize a third party service feature with a purchase as well as be used to help authenticate the transaction. Accordingly, a user may obtain the benefits of third party service features while making online purchases via the use of dynamic security codes representative of security information and third party service features.

Figure 5:
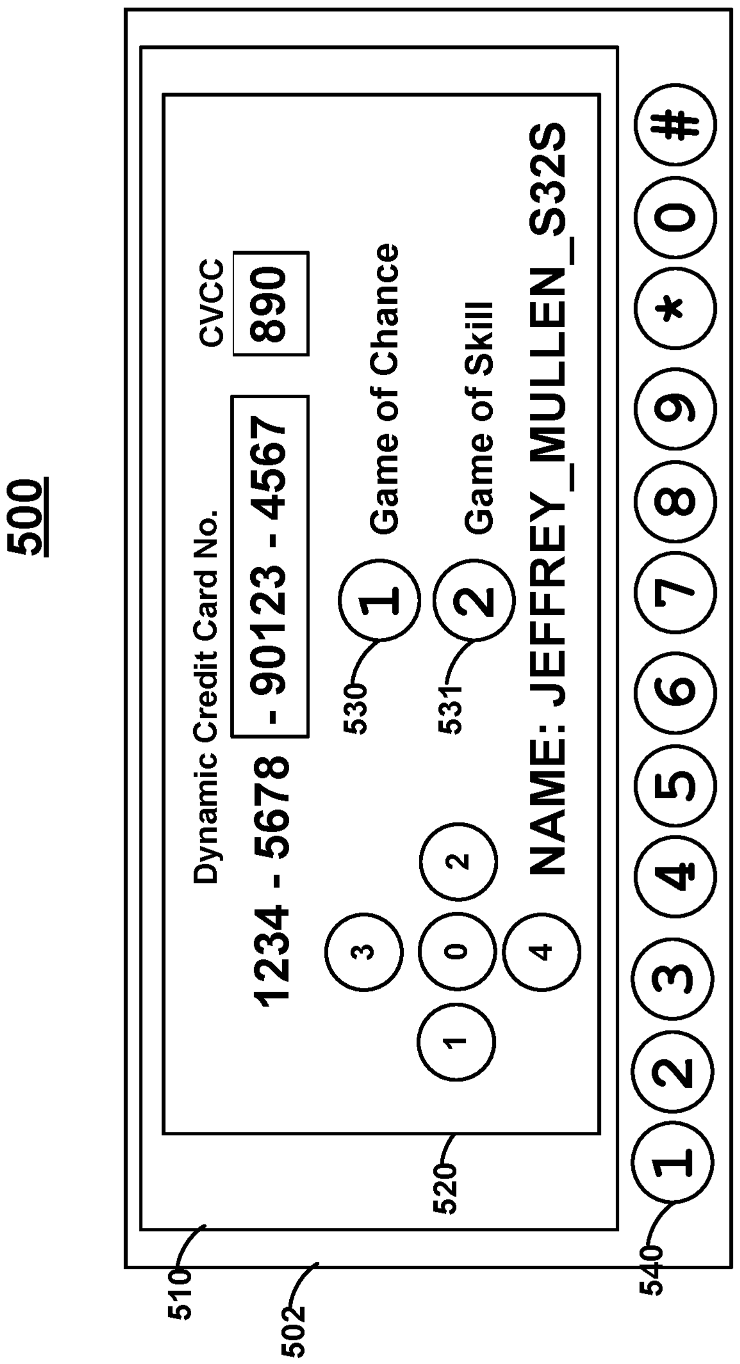
FIG. 5 is an illustration of a device constructed in accordance with the principles of the present invention.

FIG. 5 shows device 500 that may include housing 502, display 510, virtual card 510, physical buttons 540, and virtual buttons 530 and 531. Device 500 may be, for example, a mobile telephonic device or other device (e.g., portable computer such as a portable tablet computer). Display 510 may be a touch-sensitive display. Person skilled in the art will appreciate that any physical card provided herein may be provided as a virtual card on a mobile telephonic device. Physical buttons may, for example, correspond to virtual buttons. Device 500 may communicate information to a card reader, for example, via a contactless signal (e.g., an RFID signal) or contact-based signal (e.g., a USB connection). For example, virtual button 530 may correspond to one feature from one third party service provider (e.g., a sweepstakes feature) while virtual button 531 may correspond to another feature from another third party service provider (e.g., a game of skill feature). Persons skilled in the art will appreciate that the device provider may, for example, provide features. Additionally, for example, all features for a card may be utilized with a particular payment account (e.g., a credit account) such that a payment transaction with that payment account is performed if any feature is selected. As per another example, one or more features may be associated with a payment account (e.g., a credit account) while an additional one or more features may be associated with a different payment account (e.g., a debit account). Accordingly, a feature selected associated with a credit account may be utilized to purchase with credit and may perform an additional action associated with that feature and a different feature selected associated with a debit account may be utilized to purchase with debit and may perform an additional action associated with that different feature.

Figure 6:
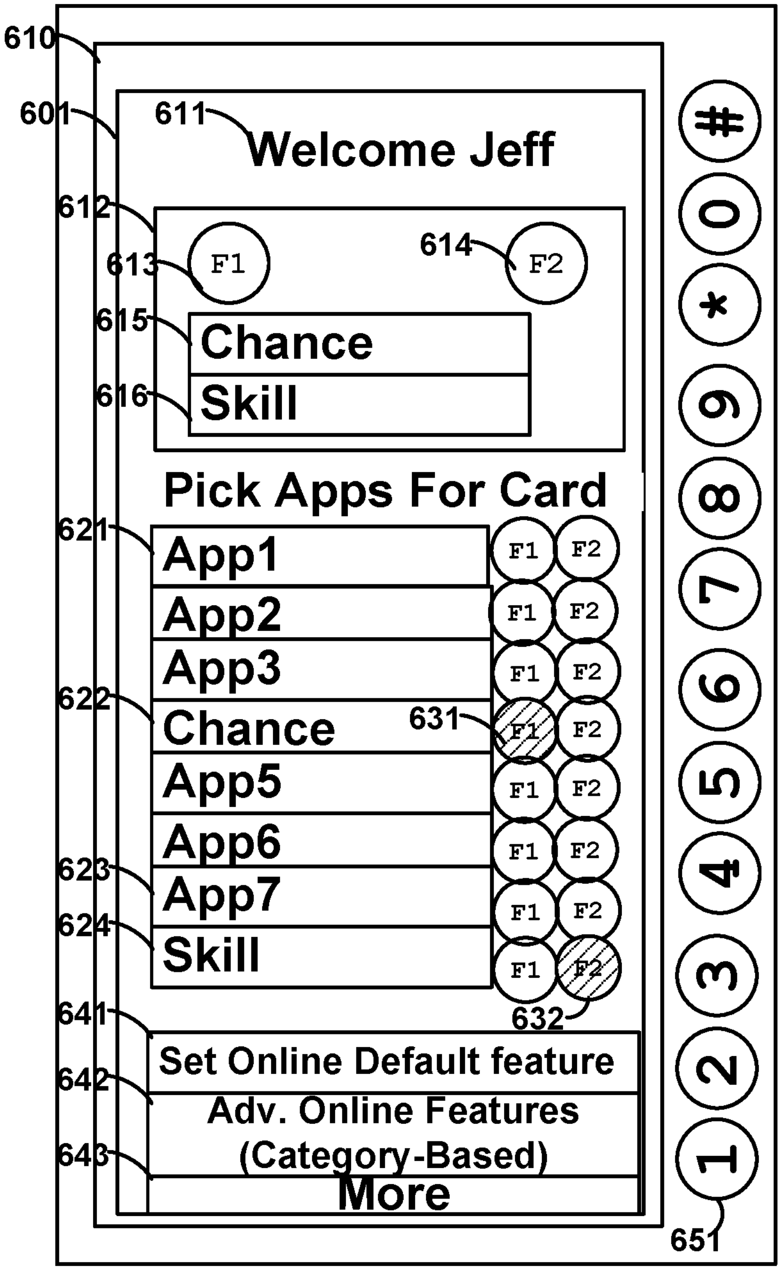
FIG. 6 is an illustration of a device constructed in accordance with the principles of the present invention.

FIG. 6 shows device 600. Device 600 may include one or more physical buttons 651, display screen 610 (e.g., a touch display screen such as a capacitive-touch or resistive-touch display screen), GUI 601, text 611, virtual card 612, virtual indicia 613 and 614, field descriptors 615 and 616, application 621-624, selection options 631, 632, and 641-643.

A user may associate a card, such as a powered or non-powered card, with an application manager for managing third party service features. Such an application manager may be provided, for example, on a remote facility and displayed on a graphical user interface to allow a user to change the third party service features associated with a card. In this manner, a user may utilize a GUI to be provided with an ecosystem of applications and may, for example, select, at any time, a particular feature to associate with a card or a card button. Persons skilled in the art will appreciate that a default feature may be provided or that a number of features provided by a card issuer or entity may be provided in addition to third party service features. For example, a card issuer may provide a card with a default on one button for credit and a default for a second button as decoupled debit. A user may press the first button to perform a credit transaction. A user may press the other button to perform a decoupled debit transaction. A button may be provided to allow a user to associate the feature with button 613 or 614 with card-not-present purchases (e.g., an online, telephone, or manual key-entry purchase). In this manner, a user may utilize an already selected feature for card-not-present purchases. Such a button may take the form of a toggle switch, located between buttons 613 and 614, so that the user can toggle the switch toward the side of button 613 to associate card-not-present purchases with button 613 and can toggle the switch toward the side of button 614 to associated card-not-present purchases with button 614.

Virtual card 612 may be provided as a representation of a user's physical card associated with an application manager. A user may be provided with the ability to change between multiple physical cards and configure the features associated with those multiple physical cards. Accordingly, virtual card 612 may be provided with button indicia 613 in the configuration of, and indicative of, one physical button associated with a user's physical card and virtual card 612 may be provided with button indicia 614 in the configuration of, and indicative of, another physical button associated with a user's physical card. Fields 615 and 616 may include the features associated with each button. Accordingly, a user may, for example, view virtual card 612 in order to refresh the user's memory on the features associated with the physical buttons on a user's physical card (not shown). GUI 601 may be, for example, provided as an application for a device (e.g., a portable computing device or a mobile telephonic device) or retrieved information from a web browser. Text 611 may, for example, identify the user associated with virtual card 612 and the corresponding physical card (not shown).

A list of applications may be provided on a card. Such applications may provide features for a third party service provider. A user may, for example, select that different applications be associated with a particular card or a particular button on a card. For example, selection 631 may associate application 622 to the physical button of a card associated with virtual button 613. Selection 632 may associate application 624 to the physical button of a card associated with virtual button 614. In doing so, a user may change the features of a card by using GUI 601. A physical card (not shown) may communicate information indicative of the button that was pressed with other payment data (e.g., an account number, security code, and other data). For example, information indicative of the button that was pressed may be included in discretionary data of a payment message. A payment message may be, for example, one or more tracks of magnetic stripe data (e.g., communicated from a dynamic magnetic stripe communications device), an RFID message (e.g., an NFC message from an radio frequency antenna), or an exposed IC chip message (e.g., an EMV message) from an exposed IC chip. Such information may be passed to a card issuer or processor from a point-of-sale and any intermediary devices (e.g., a merchant acquirer processing server) and the information may be passed to a remote facility (e.g., a facility providing an application manager) such that the remote facility may determine the button that was pressed by a user. This remote facility may, in turn, retrieve information associated with the third party feature (or a feature of a card issuer, processor, application manager provider, or any entity) and forward information to that feature provider such that the feature may be performed. Additional Information may be returned to the entity that provided the information indicative of the button the user pressed. Persons skilled in the art will appreciate that if, for example, a non-powered card is utilized then information indicative that a purchase was made may be provided to an application manager provider such that the application manager provider can initiate the desired feature for the non-powered card. For non-powered cards, for example, features may be associated with different types of purchases such as, for example, one feature may be provided for a particular merchant type (e.g., a game feature for gas purchases) and another feature may be provided for a different merchant type (e.g., a sweepstakes for transportation purchases). Features may be associated with other characteristics of a purchase such as, for example, a purchase above a particular amount (e.g., at or above $100) or a purchase below a particular amount (e.g., below $100). Such additional feature selections may be provided, for example, for powered cards and devices.

The type of the feature may be provided next to the feature. For example, application 622 may include information to associate the application to a particular type of feature (e.g., a piggyback transaction). Application 623 may include information to associate the application to a particular type of feature (e.g., a piggyback transaction). Application 624 may include information to associate an application to a particular type of feature (e.g., a statement credit). Persons skilled in the art will appreciate that a feature may include both, for example, a piggyback transaction component and a statement credit component. An administrator of a remote facility or the application provider may determine the category of a particular application. Options may be provided to a user that do not have features such that, for example, a credit transaction or a debit transaction may occur without any additional third party service provider features.

GUI 601 may be provided, for example, on a card issuer's website such as, for example, on a bill statement web page. GUI 601 may be provided, for example, above the bill statement or to the right of the bill statement. Accordingly, for example, a user may utilize the application manager to manage application features when the user is logged into his/her account. Similarly, a third party service provider may utilize GUI 601 as part of a user's administration or experience of that third party service. Accordingly, for example, a user's profile page for a third party service may include GUI 601. In this manner, application manager provider may provide web-code that retrieves GUI 601 from a remote facility managed by the application manager provider. Selection 641 may be utilized by a user to set a feature as a default feature to be utilized, for example, in card-not-present transactions (e.g., phone and online transactions) and transactions that are manually keyed in at the point-of-sale by a cashier. Selection 642 may be utilized to search for features based on categories. Particularly, a user may be provided with a list of categories. A user may select a category and be provided with, for example, sub-categories or applications in the category. Applications may be provided, for example, in alphabetical order, date list ordered, or any other type of order. Selection 643 may be utilized for additional selection options.

A card may be provided with one button for a particular payment account (e.g., credit) and one button for a changeable feature (e.g., a sweepstakes and/or game of skill). Accordingly, a user may, for example, only need to remember one feature associated with a card. A credit account may include rewards such as points, cashback, or miles, from the card issuer. Accordingly, pushing the payment account button may earn the user such rewards. Pushing the changeable feature button may, alternatively, for example, not earn the user such rewards and may instead initiate a changeable feature. In doing so, for example, the cost of providing a card may be reduced in that the cost of rewards for the card may be reduced. Rewards may not, for example, be associated to a credit account.

Figure 7:
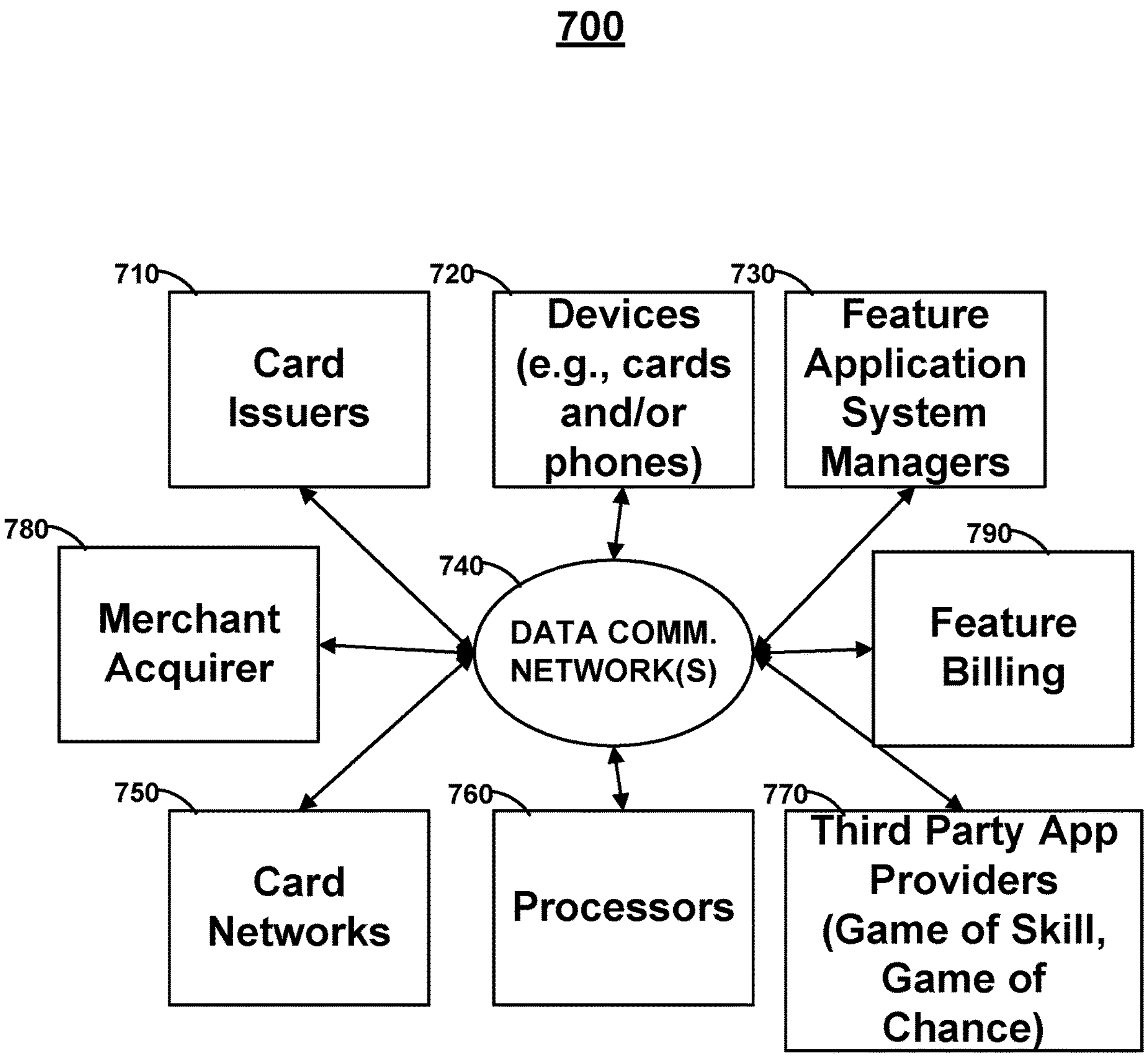
FIG. 7 is an illustration of a network constructed in accordance with the principles of the present invention.

FIG. 7 shows network 700 that may include, for example, card issuer(s) 710, device(s) 720, feature application system manager(s) 730, data communications network(s) 740, card network(s) 750, processor(s) 760, third party application provider(s) 770 such as game of skill and game of chance providers, merchant acquirer(s) 780, and feature billing servers and/or facilities 790. Other entities may include resources in network 740. For example, device provider(s) may provide resources in network 700. Feature application system manager(s) 730 may manage different identification numbers for a user and/or card for different entities and may exchange both information and value between the entities.

A remote facility may, for example, receive all, or a portion of, payment transactional information for a purchase from a processor and/or issuing bank. The received information may include, for example, a payment card number. The remote facility may, for example, provide a generic identification for a user and may provide this generic identification to third party service providers. Alternatively, for example, a user identification may be provided by a processor and/or issuing bank so that a payment card number is not provided to the remote facility. The remote facility may similarly be provided with different user identifications from different third party service providers. The remote facility may, for example, manage these service provider and processor/bank identities such that a particular identity that one entity uses is not provided to a different entity. In this way, the remote facility may provide information brokering.

Figure 8:
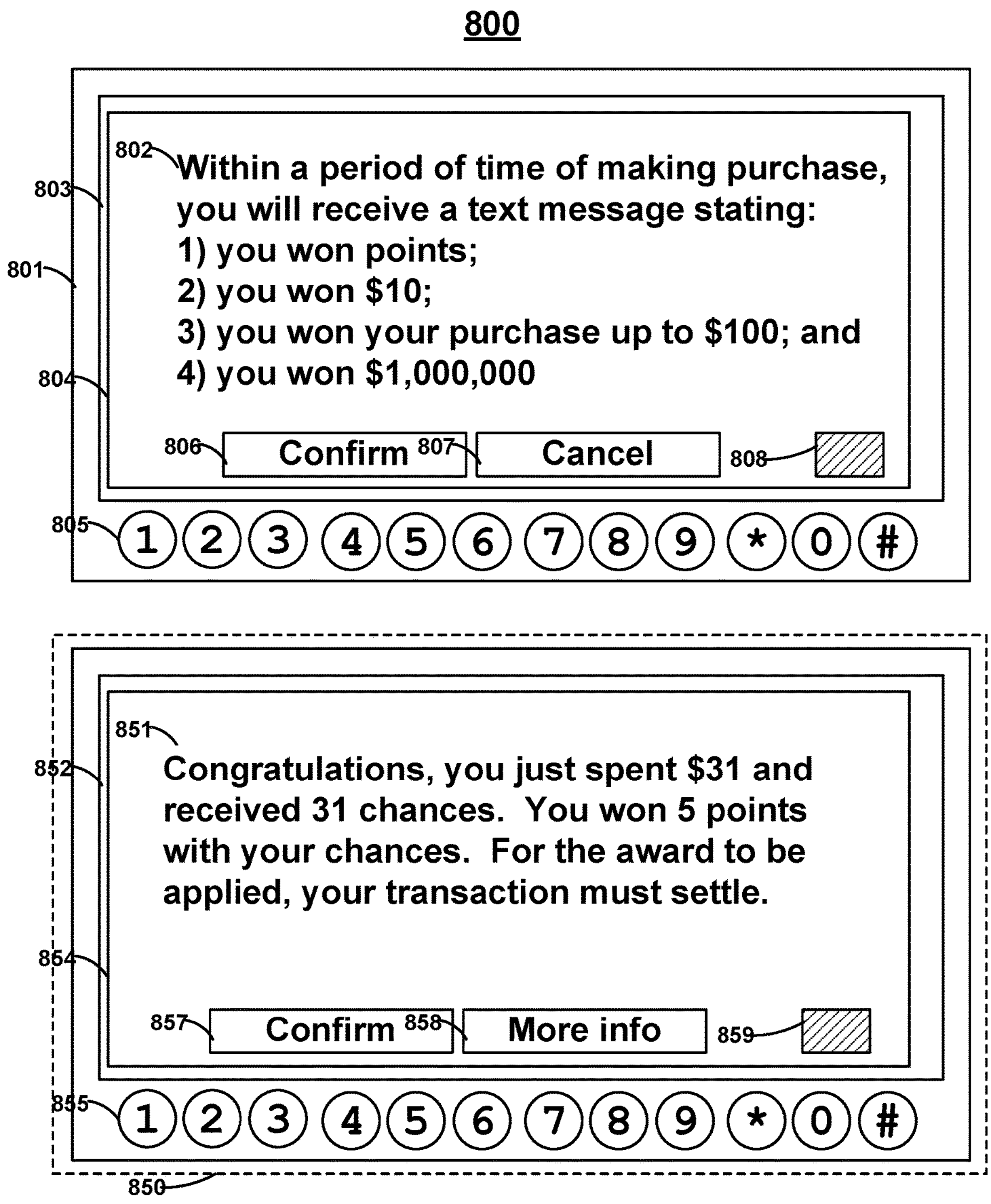
FIG. 8 is an illustration of a graphical user interface constructed in accordance with the principles of the present invention.

FIG. 8 shows graphical user interface 803. Graphical user interface 803 may be, for example, an internet browser display on a website or an application display on a device (e.g., device 801 having buttons 805). A user may, using graphical user interface 800, select a feature for a payment card, or other device, (e.g., select a feature for a particular button of a payment device such as a payment card). Graphical user interface 802 may provide detailed information about the operation of the selected feature. For example, interface 802 may provide a user of a game of chance with instructions on how the user may be notified of winning a prize along with the tiers of the prize. The odds of winning a prize and the amount of a purchase for an entry into the game of chance may also be provided. Light area 808 may be utilized to provide light pulses, indicative of information, to a payment device, such as a payment card. For example, the payment device, such as a payment card, may include a light sensor to receive the light pulses and discern the encoded information. The encoded information may be information associated with the feature, such as the name of the feature. In doing so, for example, the name of the selected feature may be displayed on a display of a card when a button associated with the selected feature is pressed by a user. For a game of chance, light area 808 may be provided to a user so that the user can determine if the user won a prize. Information indicative of the results of the game of skill may then be communicated, for example, to the card via a light sensor on the card. The card may then display on a display whether or not a prize was won, in addition to displaying the prize won, such that the user experiences winning a prize from the users payment card (or other payment device). Graphical user interface 854 on display 852 on device 850 may be accessed, for example, via a physical button (e.g., button 855). Information 851 may be displayed to indicate to a user the number of chances earned with a purchase, the award itself, and the rules to redeem the award. Button 857 may be utilized to confirm that the user desires the award. Button 858 may be utilized for a user to get more detailed information about the game of chance and the prizes associated with the game of chance. Light area 859 may be provided such that information from information 851 may be communicated to a payment card (or other device) for display on a display.

Figure 9:
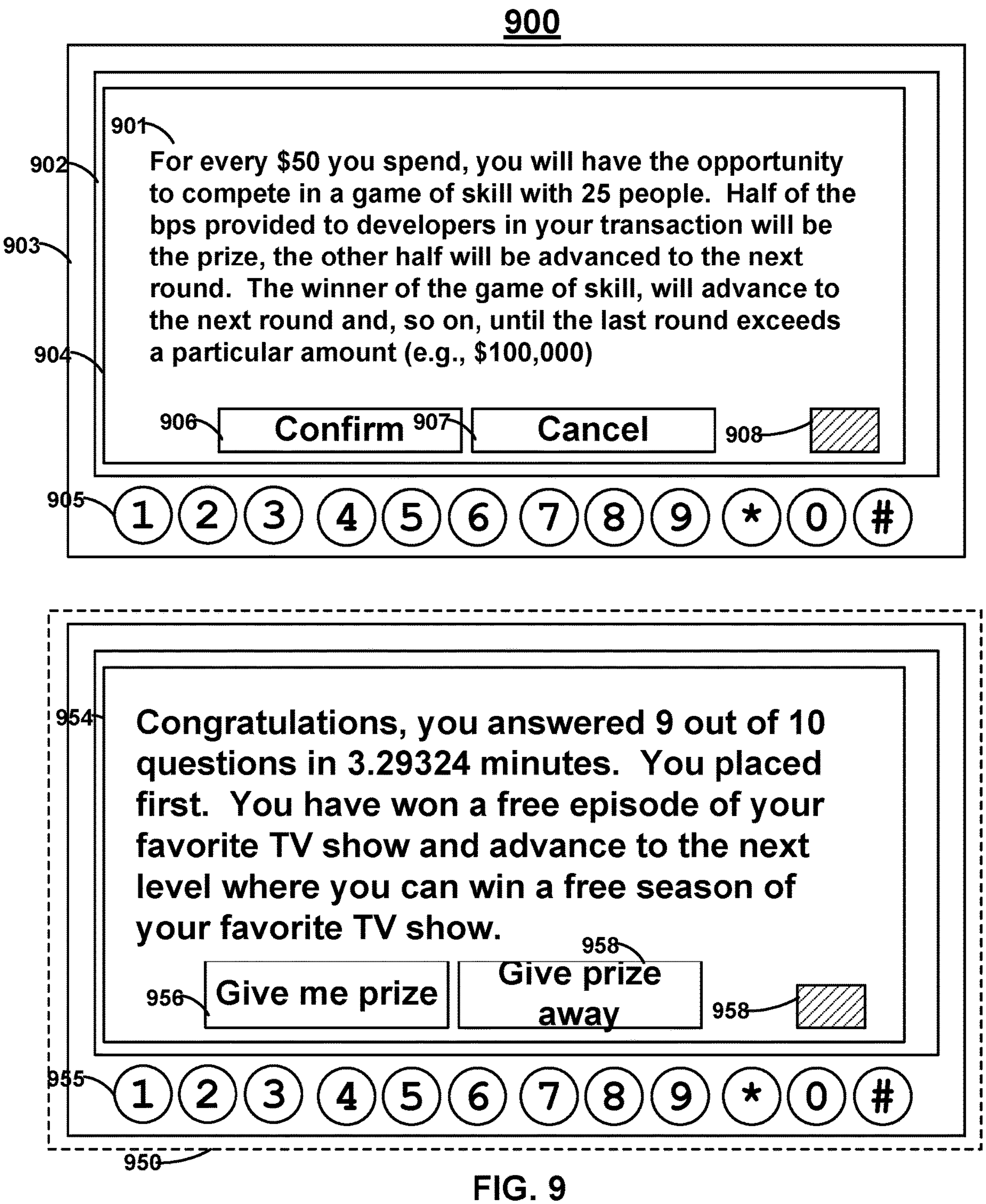
FIG. 9 is an illustration of a graphical user interface constructed in accordance with the principles of the present invention.

FIG. 9 may include graphical user interface 901. Graphical user interface 901 may be provided on display 902 of device 903 having buttons 905. Confirmation button 906 and cancel button 907 may be included as well as light box 908. Interface 901 may indicate to a user information about a game of skill. Particularly, interface 901 may provide information indicative of the amount of spend for playing the game of skill, the rules of the game of skill, the funding of the game of skill, and the prizes of the game of skill. Confirmation button 906 may associate the game of skill feature to a button previously selected to be associated with the game of skill. Button 906 may cancel the association. Light area 908 may communicate information associated with interface 901 to an electronic card or other device.

Graphical user interface 954 may be provided on a display of a device 950 having buttons 955. Button 956 and button 957 may be included as well as light box 958. Graphical user interface 954 may include, for example, information indicative of the results of the game of skill that a user participated in as well as any prize associated with those results. Button 956 may be associated with redeeming a prize for a user and button 958 may be associated with giving a prize away to a third party. In this way, users may be provided with the ability to give prizes won to friends, family, and/or charity.

Figure 10:
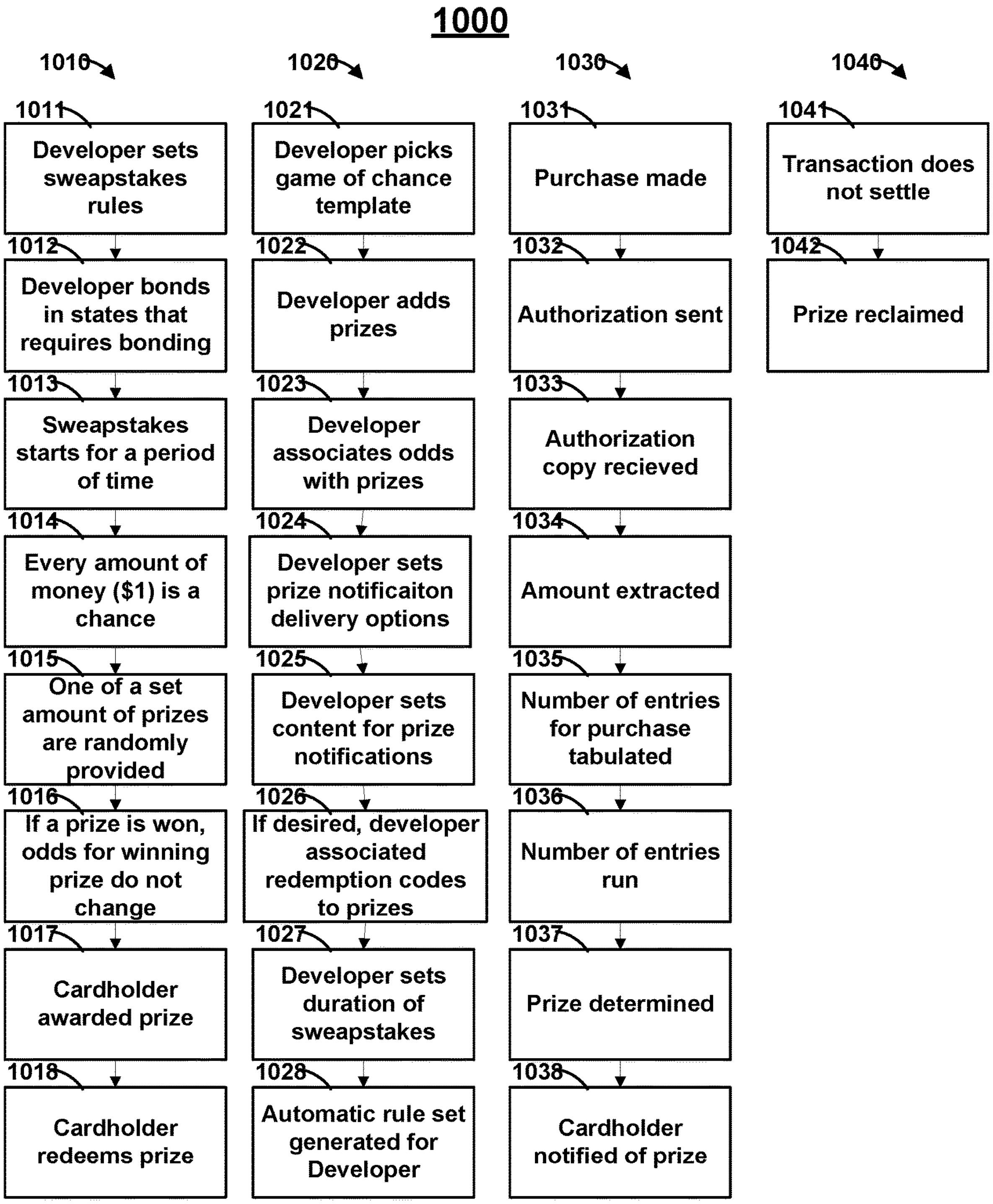
FIG. 10 is an illustration process flow charts constructed in accordance with the principles of the present invention.

FIG. 10 shows process 1010 having steps 1011-1018, process 1020 having steps 1021-1028, process 1030 having steps 1031-1038, and process 1040 having steps 1041-1042.

Process 1010 may include step 1011, in which a developer sets the rules for a sweepstakes. Persons skilled in the art will appreciate that features may be associated with non-powered cards when the cards are shipped and may not be changed for the life of the card. Persons skilled in the art will also appreciate that features may be associated with non-powered cards and changed by a user via a mobile device (e.g., a mobile telephonic phone or mobile tablet computer)) or via a stationary device (e.g., via the user's bank statement on their user's website viewed from a browser of a desktop computer). Step 1012 may be included and a developer may agree that the developer is bonding in states that require bonding to run a game of chance. A developer may be prompted to upload documentation that proves the appropriate bonds are in place. Step 1013 may be initiated in which the sweepstakes starts. A period of time may be associated with the sweepstakes. The period of time may be set by a developer, and may have a minimum and maximum threshold set by a ecosystem provider. Step 1014 may be initiated, in which a particular amount of money of a purchase is associated to a particular number of chances in the game of change. Step 1015 may be provided in which a user wins a prize, from one or more prizes, as a result of a random drawing. Prizes may have the same odds of winning or different odds. The use of entries into a game of chance may change the odds of winning or may not change the odds of winning. In step 1016, the odds are not changed for winning a prize. In step 1017, a cardholder is awarded the prize won. In step 1018, a cardholder redeems a prize. A prize redemption may take the form of, for example, emailing a redemption code to a user so that the user can use the redemption code on a website to obtain digital or physical goods.

Process 1020 may be included. Step 1021 may be included in which a developer picks a template to customize for an application developed by, for example, the ecosystem provider. In this manner, developers may more easily create applications for the ecosystem. A developer may pick a game of chance template in step 1021. Other templates may include, for example, a game of skill template. Developer may add prizes in step 1022. Developer may associate odds with prizes in step 1023. Developer may set the type of prize notification delivery options in step 1024. Developer may set content for the prize notifications in step 1025. Developer may provide redemption codes for prizes in step 1026. Developer may set duration of sweepstakes in step 1027. An automatic rule set may be generated for the developer based on the developer's selections that is provided to a user when the user selects, or plays, the game of chance.

Process 1030 may be utilized and may include, for example, step 1031, in which a purchase is made. Authorization of the purchase may be sent in step 1032. The ecosystem provider may receive a copy of this authorization in step 1033 and may extract information from it in step 1034 so that a number of entries for the purchase may be tabulated in step 1035 and a number of entries run in step 1036 so that a prize may be determined in step 1037 and notified of the prize in step 1038. An ecosystem provider, or other entity receiving authorization data, may provide the data to a third party service provider (e.g., a third party game of chance provider) such that parts of process 1036 may be provided by that provider. Process 1031 may, for example, utilize settlement data in lieu of, or in addition to, authorization data to provide at least a portion of the steps of process 1030.

Process 1040 may be included. Step 1041 may be included in which a transaction that was authorized does not settle. Step 1042 may be included in which a prize is reclaimed for purchases that did not settle. A user may be notified that the user will receive the reclaimed prize upon completing a purchase, or purchases totaling the amount of the non-settled transaction. A user may also be notified for transactions that did not win and did not settle that the user will not be eligible to win a prize again until the amount associated with the non-settled amount is purchased. An amount of time may be required before prizes are claimed. For example, a user may be notified of a prize at authorization or settlement, but may not be eligible to redeem the prize for a period of time (e.g., at time of purchase to 90 days).

Figure 11:
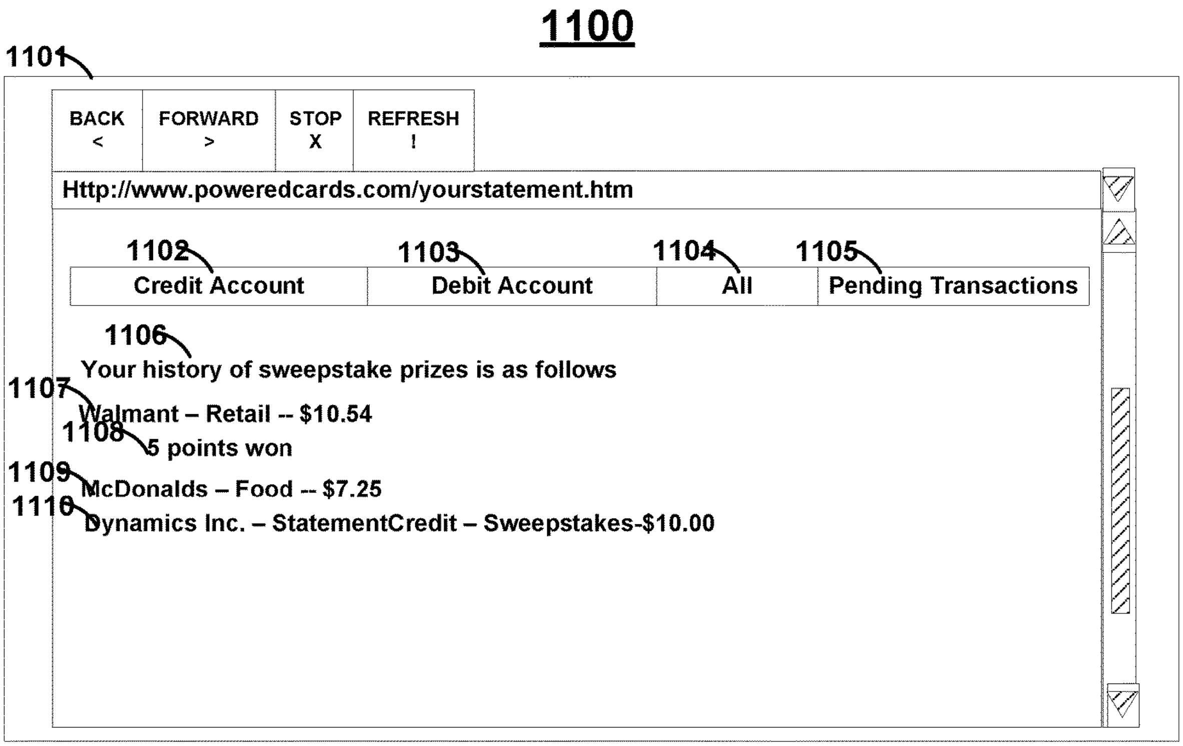
FIG. 11 is an illustration of a graphical user interface constructed in accordance with the principles of the present invention.

FIG. 11 shows GUI 1101 that may include a bill statement for one or more accounts. Selection 1102 may be utilized to see a bill statement for a credit account. Selection 1103 may be utilized to see a bill statement for a debit account. Selection 1104 may be utilized to see a consolidated bill statement for multiple accounts. Selection 1105 may be utilized to see a bill statement for pending transactions. Information 1106 may be provided to indicate the history of a feature (e.g. the history of a sweepstakes). Statement entry 1107 may be provided as a purchase transaction at a store. Statement entry 1108 may be provided by a remote facility that indicates a prize was won. Statement entry 1109 may be a purchase transaction. Statement entry 1110 may be provided by a remote facility that initiated a credit transaction utilizing a merchant acquirer and determining a particular descriptor to utilize when making the purchase so that additional information is provided to a consumer.

Persons skilled in the art will appreciate that a user may utilize a third party feature with a purchase that includes both a piggyback transaction and a statement credit component. Accordingly, a remote facility may perform the calculation as to the larger component, determine the type of transaction needed to implement the difference between the two components on the larger component. Accordingly, the remote facility may perform a piggyback transaction or a statement credit in the amount of the difference of the individual transactions. Fees billed to third party service providers for the components may not be charged for the overall. The remote facility may dynamically change the merchant name to include dynamic information indicative not only of the merchant name (e.g., the name of the operator of the remote facility/server(s)) but also indicative that the two transactions were combined and the difference was applied as either a credit or a piggyback transaction.

Persons skilled in the art will appreciate that a keep the change functionality may be provided by a feature. A secondary transaction may be initiated to round the transaction up to a particular monetary unit (e.g., round up to the nearest dollar, two dollars, even dollars, five dollars, ten dollars, or twenty dollars). The additional amount may be charged by the feature as a secondary transaction and rewards may be provided by the feature provider associated with the amount utilized to round up the transaction. In doing so, for example, a user may slowly accelerate the earning of particular rewards (e.g., game of chance and/or game of skill entries) while simplifying their personal accounting by accounting with particular monetary units.

Figure 12:
FIG. 12 is an illustration of process flow charts constructed in accordance with the principles of the present invention.

FIG. 12 shows process 1210 having steps 1211-1218, process 1220 having steps 1221-1228, process 1230 having steps 1231-1238, and process 1240 having steps 1241-1245. Process 1210 may include step 1211 in which a developer sets the rules for a game of skill. Step 1212 may be provided in which the developer selects the prizes for the game of skill. Step 1213 may be included in which a game of skill starts for a threshold (e.g., a number of games or an amount of time). Step 1214 may initiate in which every pre-determined amount of purchase earns a game of skill. A prize may be won based on the results of the game of skill in step 1215. If a prize is won, the winner may move to the next round if another round is provided in step 1216. If more players are needed to initiate a round, players are waited for in step 1217. The round may be started in step 1218 when the appropriate number of players have joined the game of skill.

Process 1220 may be included. A purchase may be made in step 1221. Part of the purchase revenue may be allocated to a round of a game of skill in step 1222. Part of purchase revenue may be allocated to other rounds in the game of skill in step 1223. The cost of a game may be accounted when a player wins a prize in step 1224. A game may be stopped after the final round in step 1225. A user playing a game may still earn more game entries if purchases are made during the game in step 1226. Additional game may be played on purchase volume in step 1227. Item may be distributed if won in step 1228.

Process 1230 may be included. Step 1231 may be included in which a developer selects a game of skill template. A developer may test the game of skill using automated tests in step 1232. The developer's game of skill may be approved for publication in step 1233. The developer's game of skill may be published in step 1234. The developer's game of skill may be played in step 1235. The developer's game of skill may be monitored for integrity in step 1236. The developer's game of skill may be warned if the integrity is compromised (e.g., the game of skill operates slowly or the security of the game is compromised). In step 1238, the developer's game may remain published if issues are fixed within a period of time. Else, or alternatively, for example, the game may be unpublished until the issues are corrected.

Process 1240 may include step 1241 in which a purchase is made. Step 1242 may include a game of skill that is awarded. Step 1243 may include a game being played. Step 1244 may include a transaction utilized to earn a game of skill that does not settle. Step 1245 may include an item being not awarded or reclaimed as the transaction that gained entry to the game of skill did not settle or settle without a charge-back or charge-off or return for a period of time (e.g., 1-90 days).

Figure 13:
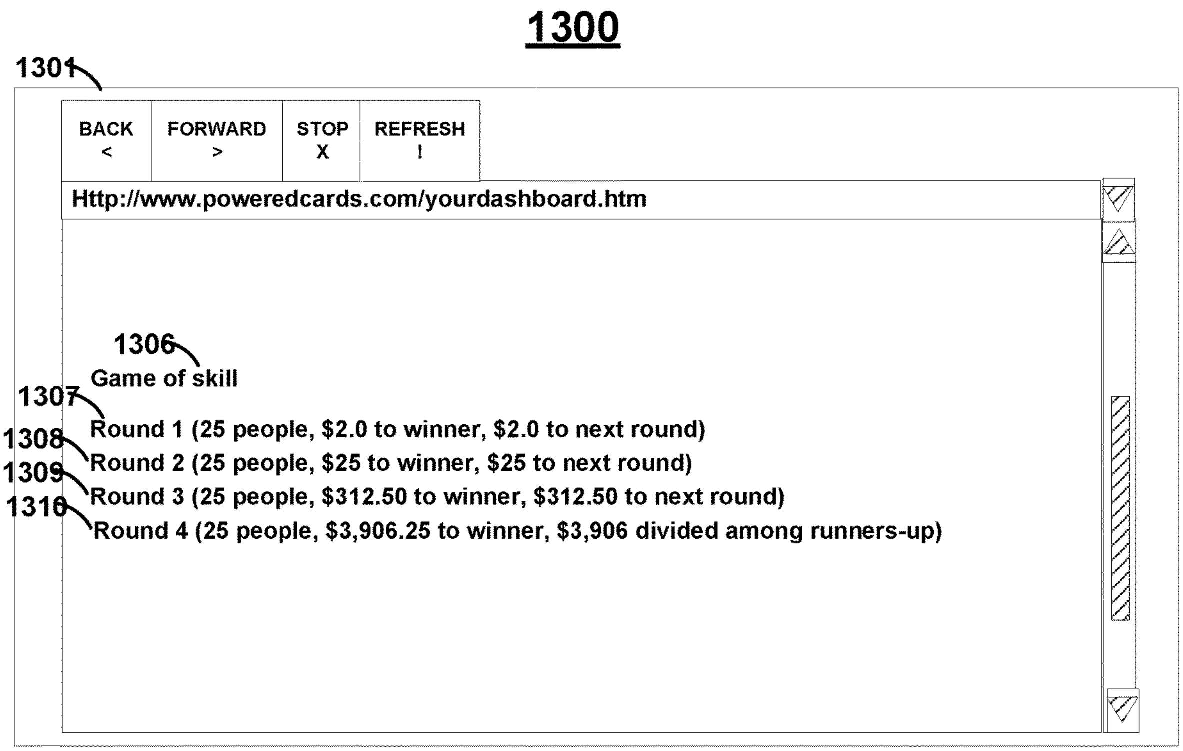
FIG. 13 is an illustration of a graphical user interface and a device constructed in accordance with the principles of the present invention.

FIG. 13 shows GUI 301 which may include dashboard 1306. GUI 1350 may also be provided with pricing information 1351-1360. Dashboard 1306 may show the rounds of the game of skill in information 1307, 1308, 1309, and 1310 and the prizes that are awarded in each round. A game of skill, for example, may be a trivia game.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A method comprising:

receiving, on a payment device, a manual input indicative of requesting that a feature be added to said payment device;

receiving first information indicative of payment from said payment device;

combining said request for the feature with information associated with a payment transaction into a combined transaction;

sending said combined transaction to a processing facility to process said payment transaction;

retrieving, at said processing facility, said request for said feature;

sending said retrieved request for said feature to a remote server;

changing, on said remote server, a change in status of said requested feature;

providing said requested feature on said payment device based on said change in status;

wherein said requested feature is a game of skill that awards a prize upon winning said game of skill, and said game of skill is provided based on said retrieving said requested feature and data associated with said change in status.

2. A method comprising:

receiving manual input indicative of changing a feature associated with a payment device;

changing, on a remote server, said feature associated with said payment device;

receiving first information indicative of payment from said payment device;

combining information associated with changing said feature with said first information;

sending said combined information to a payment processing facility;

extracting said information associated with changing said feature;

sending said extracted information to said remote server;

retrieving said feature from said remote server, wherein said feature is a game of chance that awards a prize upon winning said game of chance, and said game of chance is provided based on said retrieving said feature and data associated with said first information.

3. The method of claim 2, wherein said prize is reclaimed upon non-settlement of said authorized payment and said prize is awarded upon authorization of a second payment with an amount larger than the amount of said authorized payment.

4. The method of claim 1, wherein said prize is awarded instantly.

5. The method of claim 1, wherein said prize is awarded after a period of time has elapsed.

6. The method of claim 2, wherein said prize is awarded instantly.

7. The method of claim 2, wherein said prize is awarded after a period of time has elapsed.

* * * * *